No. 876,637. PATENTED JAN. 14, 1908.
W. W. & H. H. HARE.
MOWER.
APPLICATION FILED SEPT. 14, 1906.
2 SHEETS—SHEET 1.
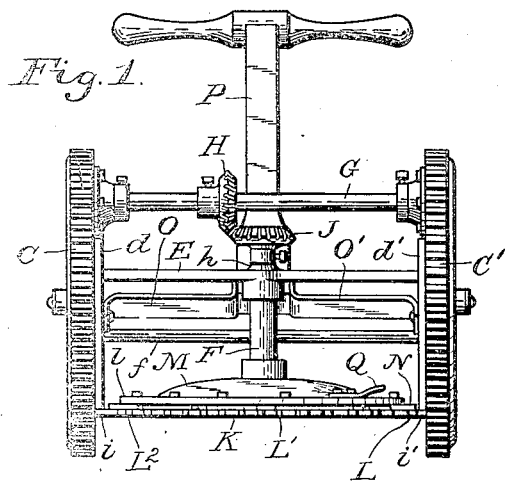
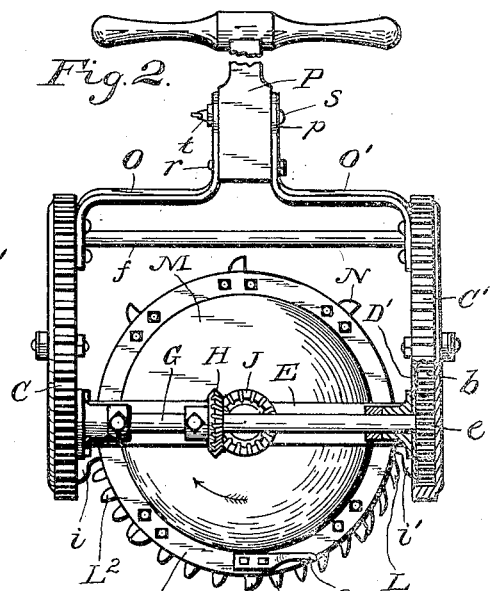
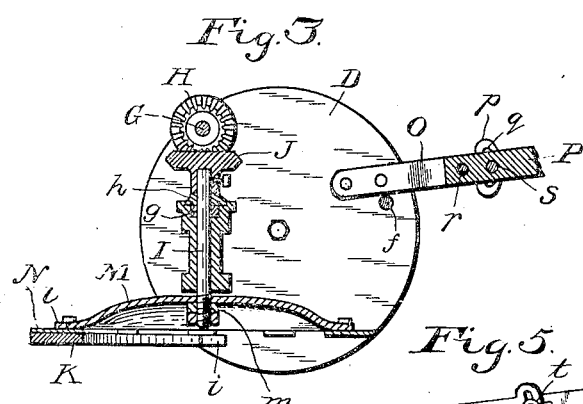
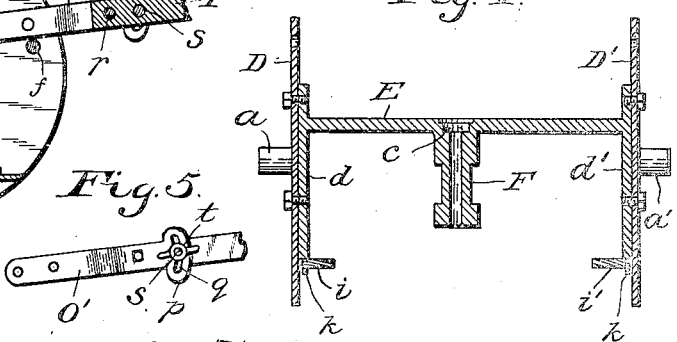
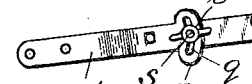
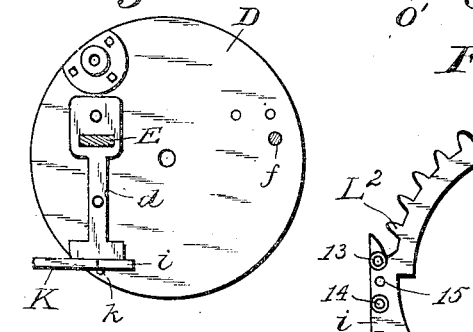
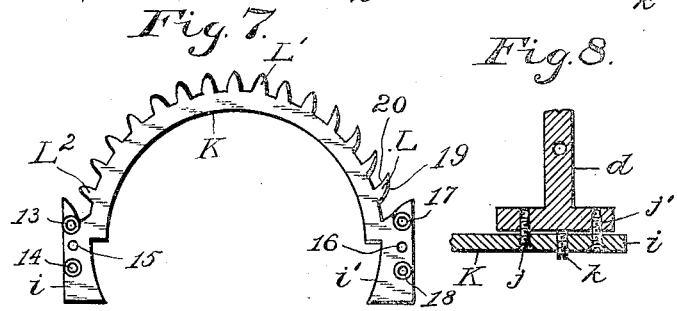
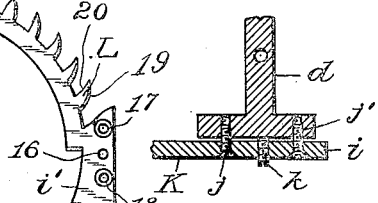
WITNESSES:
M. D. Beaty.
W. P. Morton.
INVENTORS:
W. W. Hare,
H. H. Hare,
BY E. T. Silvius.
ATTORNEY.

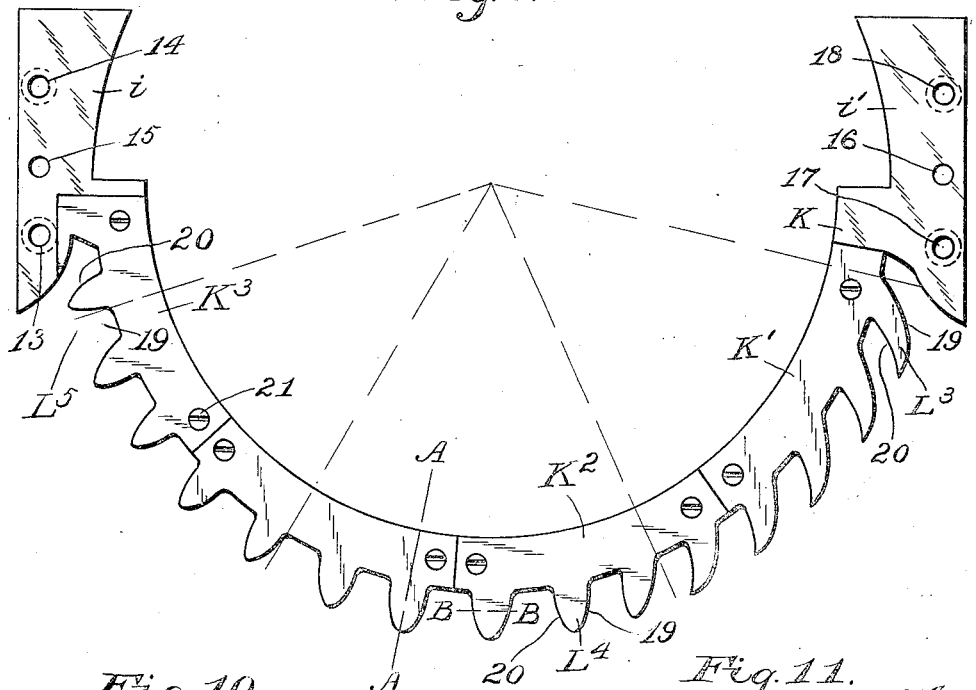
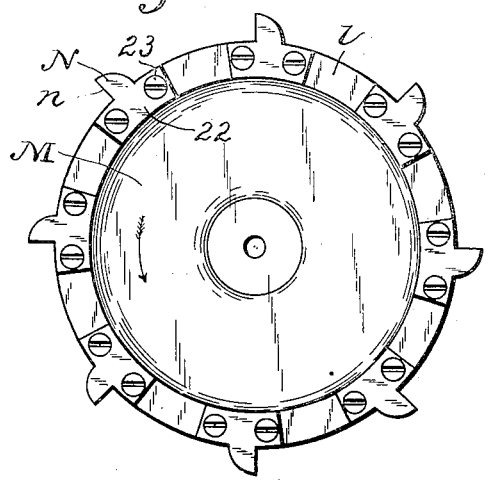
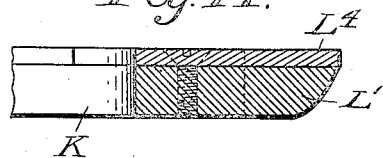
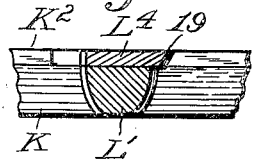

UNITED STATES PATENT OFFICE.

WILLIAM W. HARE AND HENRY H. HARE, OF NOBLESVILLE, INDIANA, ASSIGNORS OF ONE-THIRD TO ALBERT GARVER, OF OTISCO, INDIANA.

MOWER.

No. 876,637.       Specification of Letters Patent.       Patented Jan. 14, 1908.

Application filed September 14, 1906. Serial No. 334,576.

*To all whom it may concern:*

Be it known that we, WILLIAM W. HARE and HENRY H. HARE, citizens of the United States, residing at Noblesville, in the county of Hamilton and State of Indiana, have invented new and useful Improvements in Mowers; and we do declare the following to be a full, clear, and exact description of the invention, reference being had to the accompanying drawings, and to the letters and figures of reference marked thereon, which form a part of this specification.

This invention relates to machines whereby grass and similar vegetation may be cue from the ground, and it has reference mort particularly to lawn mowers, the object of the invention being to improve the cutting apparatus of machines of this character, to the end that mowers may be produced at reasonable cost that will prove efficient, durable and economical in use.

With the above-mentioned and minor objects in view, the invention consists in a mower having novel forms of cutters; and it consists further in the novel parts and combinations and arrangements of parts, as hereinafter particularly described and claimed.

Referring to the drawings, Figure 1 is a front elevation of a lawn mower having the improvements embodied in the construction thereof; Fig. 2, a top plan thereof; Fig. 3, a vertical sectional view centrally of the cutting apparatus, the operating handle being broken away and the drive-wheel being omitted; Fig. 4, a vertical sectional view of the main frame of the machine; Fig. 5, a fragmentary side view of the operating handle; Fig. 6, a fragmentary vertical sectional view taken near one of the drive-wheels; Fig. 7, an inverted plan view of the improved finger-bar or stationary knife-bar; Fig. 8, a fragmentary vertical sectional view showing the manner of attaching the finger-bar adjustably to the main frame; Fig. 9, a top plan of the improved finger-bar constructed with detachable cutters; Fig. 10, an inverted plan view of the sickle-holder and sickles or knives thereon; Fig. 11, a sectional view on the line A—A, and Fig. 12, a sectional view on the line B—B, in Fig. 9.

Similar reference characters in the several figures of the drawings designate corresponding parts or features of construction.

In the drawings C and C' designate the drive-wheels which are employed to carry the mechanism, the wheels being mounted on axles $a$ and $a'$ that are attached to disks D and D' which form parts of the frame of the machine. The wheels have internal gear-teeth $b$ for driving the cutting mechanism. The main frame comprises a beam E that extends horizontally between the disks forward of the wheel-axis, the beam having a vertical shaft-bearing F attached to the middle part thereof, the bearing having a recess $c$ in its upper end. The beam has a pair of end members $d$ and $d'$ attached thereto which extend vertically against the disks and are secured thereto. A drive-shaft G is mounted in the disk above the frame beam and has a bevel gear wheel H attached thereto, a suitable pinion $e$ being secured also to the drive shaft and in engagement with the gear-teeth $b$ of a drive-wheel. The frame comprises also a brace $f$ that is attached to the disk rearward of the wheel-axis. A vertical counter-shaft I is mounted in the bearing F and has collar $g$ secured thereto for supporting the counter-shaft and mechanism carried thereby, the collar having bearing in the recess $c$ and covered by a dust-collar $h$. A bevel gear wheel J is secured to the counter-shaft I and in engagement with the wheel H to be driven thereby.

The finger-bar K is formed in plan as a segment of a circle and has ears $i$ and $i'$ at its ends for its support. The ear $i$ has two bolt-holes 13 and 14 and also a set-screw hole 15 between the two bolt-holes, and the ear $i'$ is provided with similar holes 16, 17, and 18. The ears are attached to the bottoms of the members $d$ and $d'$ of the frame by means of bolts $j$ and $j'$ and a set-screw $k$ for each attachment, whereby the finger-bar may be adjusted accurately in vertical directions, the set-screws being adapted to bear against the members $d$ and $d'$ to hold the ears firmly against the heads of the bolts $j$ and $j'$ after they may have been adjusted. A suitable number of fingers as L, L', L², project from the convex or forward side of the finger-bar with their tops flush with the top of the body thereof, one side of each finger being adapted to serve as a stationary shear-blade, the cutting sides being designated by 19 and the opposite or rear sides of the fingers by 20. Fig. 9 shows particularly the contours of the fingers which are designed with respect to the line of motion of the machine and the axis of the counter-shaft I, the contours of the fingers differing from either end of the finger-bar to the other end thereof, although the difference between any two adjacent fingers may be slight, there being a relatively large number of fingers, and they are relatively short. The cutting sides 19 of all of the fingers are curved convexly, and the opposite sides 20 of the fingers at and near one end of the finger-bar are curved concavely, as are the fingers L, so as to afford clearance for the grass. In some cases the finger-bar is provided with removable plates on the top thereof, as shown in Figs. 9, 11 and 12 at K', K², K³, the plates having cutting blades, as L³, L⁴, L⁵, attached thereto to correspond in shapes to the fingers which they cover, the cutting sides 19 of the blades projecting slightly beyond the fingers, screws 21 securing the plates to the finger-bar, so that when the cutters become worn out they may be cheaply replaced by new ones.

With respect to the plan contours of the fingers of the curved finger-bar K, it will be seen by reference to Fig. 9 particularly, that the fingers comprise a complete series of fingers, all designed to be made use of on a curved finger-bar with the greatest advantage with one or more movable cutters swinging about a vertical shaft, the axis of the shaft being the center of the circle of which the body of the finger-bar is a segment, the center being at the intersection of radiating broken lines, by reference to which it will be seen that the fingers at and near one end of the finger-bar, as at L³, are longer than others and curved forwardly from a radiating line or towards the line of motion of the machine, so that the grass may be gathered between the fingers and pushed by the movable knives against the rear or cutting sides 19 of the fingers. Towards the middle portion of the finger-bar the fingers thereon (near L', Fig. 2, or L⁴, Fig. 9) extend more nearly along radiating lines and the lines of motion, while the remaining fingers towards and at the other end of the finger swept last by the movable cutting knives lie approximately in radiating lines, those at the terminal end extending nearly transverse to the lines of motion, as at L⁵. By this design and arrangement of the cutting fingers, with a rotating cutter the grass will be cut first at the roots of the fingers and sheared a little at a time, so that the grass can not be drawn in towards the finger-bar to choke the cutters. All the fingers are tapering and vary in contour as above described progressively, the finger first to be swept by the movable cutter having the longer cutting side so that approximately the same quantity of grass may be drawn against its rear cutting side as will be encountered and cut by the advance side of the shorter finger at the terminal end of the finger-bar.

A disk M, which is dished, has a flange $l$ at its periphery, and is secured to the counter-shaft I by nuts $m$, the flange having an under straight face that is at right angles to the axis of the counter-shaft. A suitable number of knives N have shank-plates 22 whereby they are secured to the under side of the flange $l$ so that they shall move closely upon the top of the finger-bar K or on the removable face plates thereof, the dart on the disk indicating the direction of its rotation. The cutting edges $n$ of the knives are straight and radial to the axis of the disk. The radiating broken lines in Fig. 9 illustrate relative positions of the cutting edges of the knives with respect to the cutting sides of the fingers of the finger-bar, from which it will be seen that shearing movements will result from the construction and arrangement herein described.

There are two handle members O and O' secured rigidly to the disks D and D' respectively, the members having sectors $p$ at their ends in which are curved slots $q$, and a handle-pole P is connected by a pivot $r$ to the members, the pole having a bolt $s$ extending through it and through the slots $q$ and the bolt having a thumb-nut $t$ thereon, so that the angle of the pole may be changed to suit the operator of the machine.

In order to keep the disk M and the cutting apparatus clear of grass when cutting, the flange $l$ is provided on the top thereof with an arm Q that projects upwardly and outwardly, and rearwardly from its point of attachment to the flange when in motion.

In practical use the machine is to be pushed ahead of the operator, and guided by the handle without requiring a guide-roller, and the gearing will cause the disk M to rotate about its axis at high velocity, so that the grass may be cut rather by many rapid sweeps of the movable knives across the fingers of the finger-bar than by sheer force at low speed. The arm Q will sweep over the fingers, and as the grass would be inclined ordinarily to pile against the disk D, the arm will prevent such piling and choking of the machine, and will throw the grass to the rear of the knife disk M.

Having thus described the invention, what is claimed as new is—

1. A mower including a curved finger-bar having a series of tapering cutting fingers of which the fingers on one end portion of the finger-bar are longer than the remaining fingers and curved away from the end of the finger-bar, the finger that is nearer said end being the longer and having the greater amount of curvature, the adjacent fingers successively having less length and amount of curvature, and the remaining fingers of the series being substantially normal to the finger-bar, all the fingers having curved cutting sides.

2. A mower including a frame beam having end members provided with screw-bolts, a curved finger-bar having supporting ears engaged by the screw-bolts and provided with set-screws engaging the end members, a knife-disk mounted rotatively on the beam, and knives attached to the disk.

3. In a lawn mower, a curved finger-bar having in each end portion thereof two bolt-holes and holding bolts in the bolt-holes, each end portion having also a set-screw therein between the two bolts, a frame to support the end portion of the finger-bar adapted to be engaged by the holding bolts and the set-screws, a disk supported rotatively by the frame, and cutting knives secured to the disk, substantially as shown and described.

4. In a lawn-mower, a curved finger-bar having in each one of its two end portions two bolt-holes spaced apart, each end portion having also a set-screw hole between the two bolt-holes, and cutting fingers on the finger-bar having different shapes in plan, the different fingers on one end portion of the finger-bar differing slightly one from another successively from the end of said portion to the middle portion of the finger-bar, each finger being curved and differing in length from the other fingers of said end.

In testimony whereof, we affix our signatures in presence of two witnesses.

WILLIAM W. HARE.
HENRY H. HARE.

Witnesses:
WALTER S. BROWN,
FRANK H. SMITH.